United States Patent
Miyazaki (10) Patent No.: US 8,875,757 B2
(45) Date of Patent: Nov. 4, 2014

(54) PNEUMATIC TIRE WITH TREAD HAVING LONG HOLE SHAPED DEPRESSIONS

(75) Inventor: Tetsuji Miyazaki, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 1868 days.

(21) Appl. No.: 11/863,627

(22) Filed: Sep. 28, 2007

(65) Prior Publication Data

US 2008/0092999 A1 Apr. 24, 2008

(30) Foreign Application Priority Data

Oct. 23, 2006 (JP) .................................. 2006-287666

(51) Int. Cl.
  *B60C 11/117* (2006.01)
  *B60C 11/03* (2006.01)
(52) U.S. Cl.
  CPC ....... *B60C 11/032* (2013.01); *B60C 2011/0381* (2013.01); *B60C 11/0306* (2013.01); *B60C 11/0309* (2013.01); *Y10S 152/03* (2013.01)
  USPC ............. 152/209.17; 152/209.24; 152/DIG. 3
(58) Field of Classification Search
  CPC ....................... B60C 11/032; B60C 2011/0381
  USPC ............. 152/209.17, 209.18, 209.21, 209.24, 152/DIG. 3
  See application file for complete search history.

(56) References Cited

U.S. PATENT DOCUMENTS

| 3,682,220 | A | * | 8/1972 | Verdier ......................... 152/900 |
| 4,078,596 | A | * | 3/1978 | Nakayama et al. ...... 152/DIG. 3 |
| 4,387,754 | A | * | 6/1983 | Mirtain et al. ................ 152/901 |
| 4,840,211 | A | * | 6/1989 | Makino ..................... 152/209.24 |
| 5,492,161 | A | * | 2/1996 | Fuchikami et al. ...... 152/209.21 |
| 5,665,184 | A |   | 9/1997 | Fukumoto |
| 5,918,654 | A | * | 7/1999 | Bossut ..................... 152/209.18 |
| 2003/0094227 | A1 | * | 5/2003 | Bettiol et al. ............ 152/209.18 |
| 2005/0109437 | A1 |   | 5/2005 | Shirouzu |
| 2007/0056664 | A1 |   | 3/2007 | Suzuki |

FOREIGN PATENT DOCUMENTS

| CN | 1621253 A | 6/2005 |
| CN | 1931615 A | 3/2007 |

(Continued)

OTHER PUBLICATIONS

Machine translation for Korea 2002-0049485 (no date).*

(Continued)

*Primary Examiner* — Steven D Maki
(74) *Attorney, Agent, or Firm* — Fish & Richardson P.C.

(57) ABSTRACT

In the invention, a tread surface is provided with a groove portion including a main groove continuously extending in a tire circumferential direction, and a land portion including a rib or a block separated by the main groove, wherein the land portion includes a first edge portion having a depression row formed by arranging long hole shaped depressions extending along the groove portion in the tire circumferential direction and a second edge portion extending along the main groove while being different in position in a tire width direction from the first edge portion, and not having the depression row.

5 Claims, 4 Drawing Sheets

(56) References Cited

FOREIGN PATENT DOCUMENTS

| | | | |
|---|---:|---|---|
| EP | 213452 | A2 * | 3/1987 |
| EP | 506361 | A1 * | 9/1992 |
| JP | 58-134105 | U * | 9/1983 |
| JP | 03-038406 | * | 2/1991 |
| JP | 04-218407 | | 8/1992 |
| JP | 06-106917 | | 4/1994 |
| JP | 08-99505 | | 4/1996 |
| JP | 09-272311 | * | 10/1997 |
| JP | 10-272906 | * | 10/1998 |
| JP | 2004-330812 | A * | 11/2004 |
| KR | 2002-0049485 | * | 6/2002 |

OTHER PUBLICATIONS

Machine translation for Japan 10-272906 (no date).*
Machine translation for Japan 09-272311 (no date).*
Machine translation for Japan 2004-330812 (no date).*
Machine translation for Europe 213452 (no date).*
Chinese Office Action for Application No. 200710143359.4 dated Jun. 10, 2010, 5 pages.
Office Action for JP Application No. 2006-287666 dated Aug. 18, 2011, with English translation.

* cited by examiner

PNEUMATIC TIRE WITH TREAD HAVING LONG HOLE SHAPED DEPRESSIONS

BACKGROUND OF THE INVENTION

1. Field of the Invention

The present invention relates to a pneumatic tire in which a tread surface is provided with a groove portion including a main groove continuously extending in a tire circumferential direction, and a land portion including a rib or a block separated by the main groove.

2. Description of the Related Art

Conventionally, various ideas have been cast around in connection with a problem of an irregular wear generated on a tread surface. As the irregular wear mentioned above, there has been known, for example, a center wear in which a center region of the tread surface is worn in a comparatively early stage, and a shoulder wear in which a shoulder region is worn in a comparatively early stage. As a generation cause thereof, there can be listed up an uneven ground pressure balance of the tread surface based on a tread pattern and a tire shape. In other words, in the case where the ground pressures are greatly different between the center region and the shoulder region, a difference in wear amount tends to be generated between the regions, and the center wear and the shoulder wear are generated.

A pneumatic tire described in Japanese Unexamined Patent Publication No. H8-99505 is structured such that a land portion is separated into a land portion main body and a narrow land portion by a vertical narrow groove extending in a tire circumferential direction, and a suppression of an irregular wear is achieved by sacrificing a wear of the narrow land portion. The narrow land portion is provided in a region where a wear in an early stage is concerned, and it is possible to concentrate the wear by utilizing a low rigidity thereof. Accordingly, it is possible to reduce an amount of wear of the main body land portion in the region mentioned above, so that it is possible to achieve the uniform wear of the tread surface. However, in the structure mentioned above, since a rigidity of an edge portion (an end portion adjacent to the groove portion) becomes lowered in accordance with the concentration of the wear, a rigidity balance of the land portion is deteriorated, and there is a risk that the irregular wear is inversely generated.

A pneumatic tire described in Japanese Unexamined Patent Publication No. H4-218407 is structured such that a plurality of small holes are provided in an edge portion of a block, and depths of the small holes are made shallower as farther away from a groove in a circumferential direction. However, this pneumatic tire is structured so as to uniformize a ground pressure in whole the block, neither disclosing a structure for reducing a difference in amount of wear generated between the center region and the shoulder region, nor suppressing the irregular wear of the tread surface.

SUMMARY OF THE INVENTION

The present invention is made by taking such an actual condition mentioned above into consideration, and an object of the present invention is to provide a pneumatic tire which can preferably suppress an irregular wear generated on a tread surface.

The object can be achieved by the present invention having the following structure. That is, the present invention provides a pneumatic tire in which a tread surface is provided with a groove portion including a main groove continuously extending in a tire circumferential direction, and a land portion including a rib or a block separated by the main groove, wherein the land portion includes a first edge portion having a depression row formed by arranging long hole shaped depressions extending along the groove portion in the tire circumferential direction; and a second edge portion extending along the main groove while being different in position in a tire width direction from the first edge portion, and not having the depression row.

In the pneumatic tire in accordance with the present invention, since the first edge portion of the land portion has the depression row formed by arranging the long hole shaped depressions extending along the groove portion in the tire circumferential direction, it is possible to reduce a ground area of the first edge portion so as to increase a ground pressure to accelerate a wear speed. Further, since the second edge portion extending along the main groove while being different in position in the tire width direction from the first edge portion does not have the depression row, it is possible to make the wear speed of the first edge portion close to the wear speed of the second edge portion. Accordingly, it is possible to achieve a uniform wear in the tire width direction by reducing the difference in wear amount between the first edge portion and the second edge portion, whereby it is possible to preferably inhibit the irregular wear of the tread surface from being generated. Further, since the depression has the long hole shape, it is possible to efficiently reduce the ground area of the first edge portion in comparison with the case of having the small hole shape, thereby increasing the ground pressure. Furthermore, it is possible to inhibit a rigidity of the first edge portion from becoming too low in comparison with the case of forming the long groove shape continuing in the tire circumferential direction, thereby avoiding the irregular wear due to deterioration in rigidity balance of the land portion.

If three or more main grooves are formed on the tread surface, a center wear or a shoulder wear tends to be generated in the land portion separated into a center side and a shoulder side. However, in the present invention, in the case mentioned above, it is preferable that the depression extends along any one of the main groove positioned at an outermost side in the tire width direction and the main groove near a tire equator, whereby it is possible to achieve the uniform wear of the tread surface and it is possible to achieve an excellent wear resistance.

In the structure mentioned above, it is preferable that a ratio of a depth of the depression with respect to the main groove is between 0.20 and 0.70, whereby it is possible to preferably achieve an operation and effect of the present invention mentioned above. In other words, if the ratio is less than 0.20, there is a tendency that an effect of increasing the ground pressure of the first edge portion becomes smaller, and if the ratio becomes more than 0.70, the rigidity of the first edge portion becomes lower so as to deteriorate the rigidity balance of the land portion, and there is a risk that the irregular wear is generated.

In the structure mentioned above, it is preferable that a reinforcing portion for increasing a rigidity of a first inner wall portion located at a near side to an edge end of the first edge portion of the depression rather than that of a second inner wall portion located at a far side from the edge end is provided in the first inner wall portion. It is possible to increase the rigidity of the first edge portion so as to improve the wear resistance by setting the reinforcing portion as mentioned above, whereby it is possible to regulate so as to prevent the wear speed in the first edge portion from becoming too fast. Accordingly, it is possible to more suitably achieve the uniform wear of the tread surface.

In the structure mentioned above, the reinforcing portion can be provided as a shelf-like wall forming the first inner wall portion in a stepped shape, or a slope wall of the first inner wall portion in which a groove wall angle with respect to a normal line direction of the tread surface is made larger than that of the second inner wall portion, whereby it is possible to easily and suitably structure the reinforcing portion.

DETAILED DESCRIPTION OF THE PREFERRED EMBODIMENTS

Figure 1:
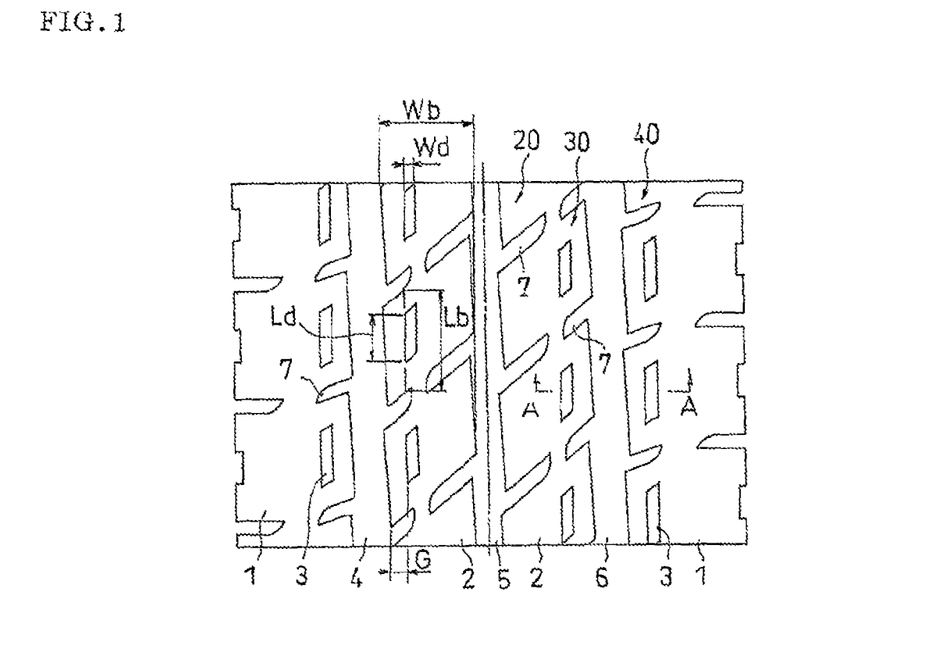
FIG. 1 is an expansion plan view showing an example of a tread surface of a pneumatic tire in accordance with the present invention.
Figure 2:
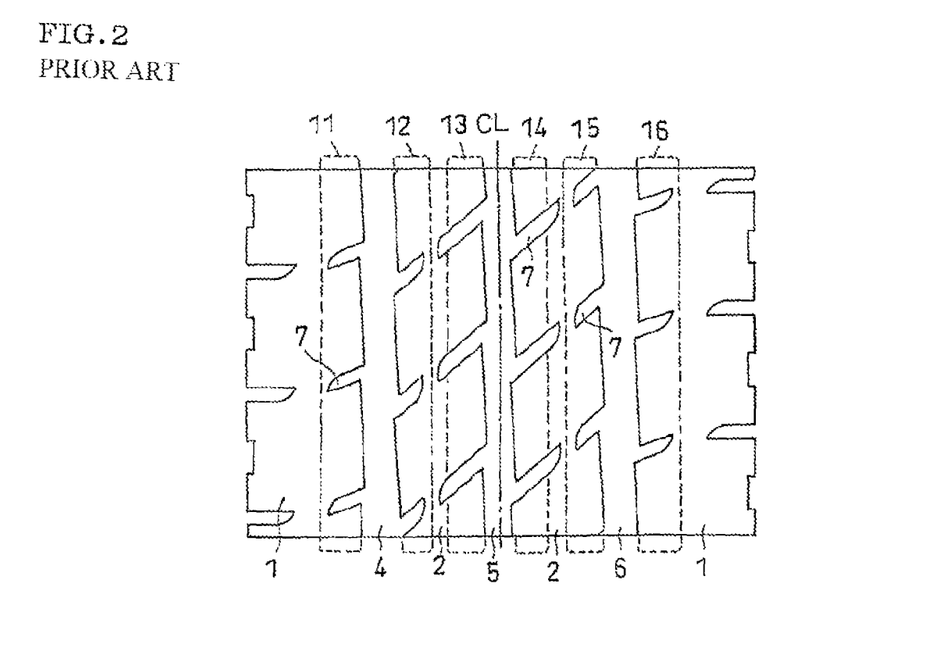
FIG. 2 is an expansion plan view showing an example of a tread surface of a conventional pneumatic tire.
Figure 3:
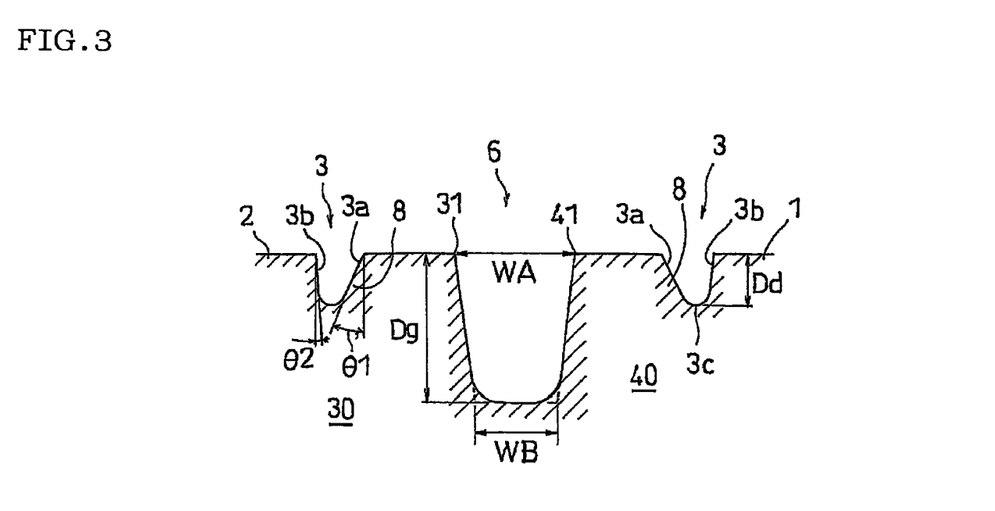
FIG. 3 is a cross sectional view along a line A-A of the tread surface shown in FIG. 1.

An embodiment of the present invention will be explained with reference to the drawings. FIG. 1 is an expansion plan view showing an example of a tread surface of a pneumatic tire in accordance with the present invention. FIG. 2 is an expansion plan view showing an example of a tread surface of a conventional pneumatic tire, and corresponds to the example in which a depression row is removed from the tread surface in FIG. 1. FIG. 3 is a cross sectional view along a line A-A of the tread surface shown in FIG. 1.

In the tread surface shown in FIG. 1, a groove portion includes main grooves 4 to 6 continuously extending in a tire circumferential direction, and a horizontal groove 7 extending so as to intersect them, whereby a land portion is separated into a plurality of blocks. Specifically, the land portion is separated into four block row by the main grooves 4 to 6, and each of the block rows is separated into a plurality of shoulder blocks 1 and a center block 2 by the horizontal groove 7. In this case, the horizontal groove 7 extends in such a manner as to be divided in the midstream, and each of the blocks 1 and 2 is provided as a substantial block connected partly to the adjacent block in the tire circumferential direction.

In the tread surface provided with three main grooves including the main groove 5 arranged near a tire equator CL, and the main grooves 4 and 6 positioned in the outermost sides in a tire width direction such as the present embodiment, a ground pressure of an edge portion 20 (a land portion within broken line frames 13 and 14 in FIG. 2) of the land portion along the main groove 5 tends to become higher than a ground pressure of an edge portion 30 (a land portion within broken line frames 12 and 15 in FIG. 2) and an edge portion 40 (a land portion within broken line frames 11 and 16 in FIG. 2) of the land portion along the main grooves 4 and 6, and the center portion tends to be moved due to an influence of a wiping. Accordingly, the center wear generally tends to be generated. Further, in the case of an LT tire, the ground pressure of the center portion becomes higher due to a high internal pressure, and there is a strong tendency of the center wear.

Accordingly, in the present embodiment, the depression row is provided in the edge portions 30 and 40 in which there is fear that the wear speed is slow in comparison with the edge portion 20. The depression row is formed by arranging a long hole shaped depression 3 extending along the main grooves 4 and 6 in the tire circumferential direction. In the present embodiment, the edge portions 30 and 40 correspond to the first edge portion, and the edge portion 20 which extends along the main groove 5 while being differentiated at the position in the tire width direction from them and does not have the depression row corresponds to the second edge portion.

Accordingly, it is possible to reduce the ground area of the edge portions 30 and 40 so as to increase the ground pressure and accelerate the wear speed, whereby it is possible to make the wear speed of the edge portions 30 and 40 close to the wear speed of the edge portion 20. As a result, it is possible to achieve the uniform wear in the tire width direction of the tread surface, and it is possible to preferably inhibit the irregular wear from being generated. Further, since the depression 3 is formed in the long hole shape, it is possible to efficiently reduce the ground area of the edge portions 30 and 40 in comparison with the case of being formed in the small hole shape so as to increase the ground pressure, and it is possible to inhibit the rigidity of the edge portions 30 and 40 from becoming too low in comparison with the case of being formed in the long groove shape continuing in the tire circumferential direction so as to avoid the irregular wear due to the deterioration of the rigidity balance of the land portion.

In the present invention, it is possible to employ the main groove extending in a zigzag shape in the tire circumferential direction, however, it is preferable that all the main grooves is close to a straight shape such as the present embodiment. In order to achieve the uniform wear of the tread surface, there can be considered to form the main groove in a region in which the wear speed is comparatively high in a zigzag shape having a large amplitude, thereby suppressing the wiping, however, there is a tendency that a drainage performance becomes lowered in comparison with the case where the main groove is formed in a straight shape.

The cross sectional shape of the depression 3 is not particularly limited, however, the present embodiment has an asymmetric cross sectional shape to the tire width direction as shown in FIG. 3. A reinforcing portion 8 for increasing a rigidity of a first inner wall portion 3a which is located at a near side to an edge ends 31 and 41 of the edge portions 30 and 40 of the depression 3 rather than that of a second inner wall portion 3b which is located at a far side from the edge end 31 is provided in the first inner wall portion 3a. The reinforcing portion 8 is provided as a slope wall of the first inner wall portion 3a in which a groove wall angle θ1 with respect to the normal line direction of the tread surface is made larger than a groove wall angle θ2 of the second inner wall portion 3b.

In the present embodiment, it is possible to increase the rigidity of the edge portions 30 and 40 by setting the reinforcing portion 8 so as to improve the wear resistance, and it is possible to regulate so as to prevent the wear speed in the edge portions 30 and 40 from becoming too high. It is preferable that the groove wall angles θ1 and θ2 satisfy a relation of θ1≥3×θ2>0 degree, whereby it is possible to suitably improve the wear resistance of the edge portion.

In the present invention, since the uniform wear of the tread surface can be achieved as mentioned above, it is preferable that the main grooves 4 to 6 are formed in the U-shaped cross section as shown in FIG. 3, and it is preferable that a relation between a surface width WA and a groove bottom width WB satisfies WB≥WA/3. In order to achieve the uniform wear of the tread surface, there can be considered that the main groove in the region in which the wear speed is comparatively high is formed in the V-shaped cross section, thereby increasing the rigidity of the edge portion, however, if the main groove is formed in the V-shaped cross section while securing the block width, the main groove volume is reduced and there is a tendency that the drainage performance is lowered.

It is preferable that a ratio Dd/Dg of the depth of the depression 3 with respect to the main groove 6 is between 0.20 and 0.70, and it is more preferable that the ratio is between 0.30 and 0.60. Accordingly, the operation and effect of the present invention mentioned above can be preferably achieved. In this case, if the ratio Dd/Dg of the depth is equal to or more than 0.4, the rigidity of the edge portions 30 and 40 tends to be lowered, so that the structure provided with the reinforcing portion 8 in the depression 3 is particularly useful.

If the ratio Dd/Dg of the depth is less than 1, the bottom wall portion 3c of the depression 3 appears on the tread surface in the process of the wear. However, in the present invention, it is possible to keep the wear balance even in a stage that the bottom wall portion 3c appears on the tread surface after the medium term of the wear, by achieving the excellent wear resistance at least in the initial stage of the wear, whereby it is possible to preferably suppress the irregular wear.

Further, it is preferable that the ratio Wd/Wb of the width of the depression 3 with respect to the block 2 is between 0.04 and 0.20, and it is more preferable that the ratio is between 0.06 and 0.17. If the ratio Wd/Wb is less than 0.04, there is a tendency that the effect of increasing the ground pressure of the edge portions 30 and 40 becomes small. On the other hand, if the ratio Wd/Wb becomes more than 0.20, the rigidity of the edge portions 30 and 40 becomes too low, and the rigidity balance of the land portion tends to be deteriorated.

A distance G in the tire width direction from the edge ends 31 and 41 of the edge portions 30 and 40 to the depression 3 is preferably between 3 and 15 mm, and is more preferably between 4 and 13 mm. If the distance G is less than 3 mm, the rigidity of the edge portions 30 and 40 becomes too low, the rigidity balance of the land portion tends to be deteriorated. On the other hand, if the distance G becomes more than 15 mm, there is a tendency that the effect of increasing the ground pressure of the edge portions 30 and 40 becomes small. In this case, it is preferable that the distance G is changed within the range mentioned above, however, it is particularly preferable that the distance G is fixed in the tire circumferential direction such as the present embodiment.

The present embodiment is the example in which one depression 3 is provided in the block 2, however, the present invention is not limited thereto. Regarding a length Ld of the depression 3, it is preferable that a ratio Ld/Lb of the length with respect to the block 2 is between 0.15 and 0.80 in the edge end side edge of the depression 3, and it is more preferable that the ratio is between 0.25 and 0.70. If the ratio Ld/Lb is less than 0.15, there is a tendency that the effect of increasing the ground pressure of the edge portions 30 and 40 becomes small. On the other hand, if the ratio Ld/Lb becomes more than 0.80, the rigidity of the edge portions 30 and 40 becomes too low, and the rigidity balance of the land portion tends to be deteriorated. In this case, the same manner as mentioned above is applied to a preferable dimension of the depression 3 with respect to the shoulder block 1.

The pneumatic tire in accordance with the present invention is equal to the normal pneumatic tire except the structure in which the land portion of the tread surface is provided with the first edge portion and the second edge portion as mentioned above, and the conventionally known material, shape, structure, manufacturing method and the like can be applied to the present invention.

[Other Embodiments]

Figure 4:
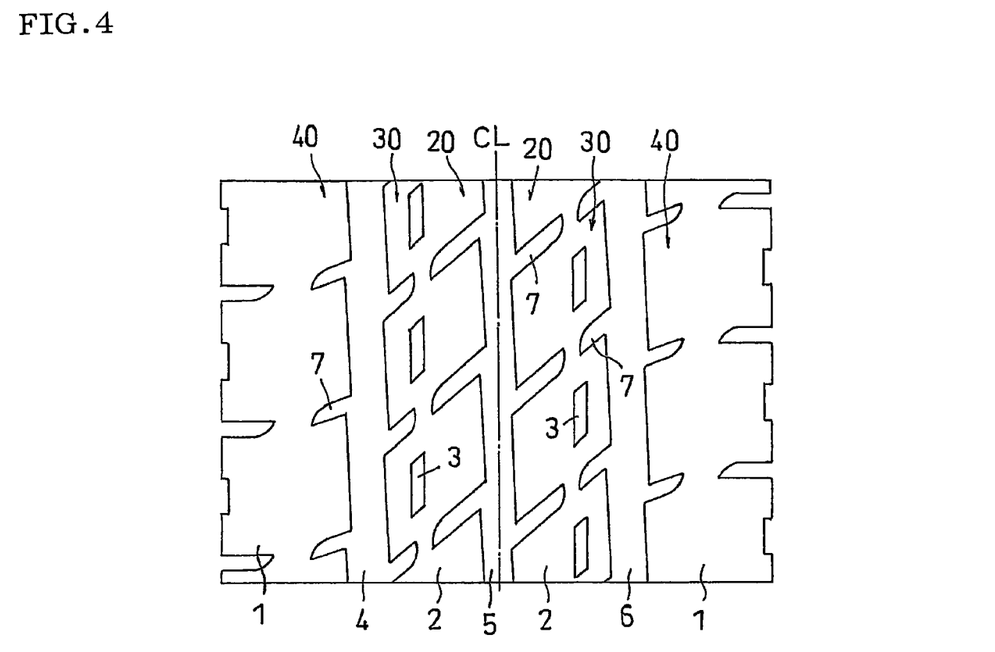
FIG. 4 is an expansion plan view showing an example of a tread surface in accordance with another embodiment of the present invention.
Figure 5:
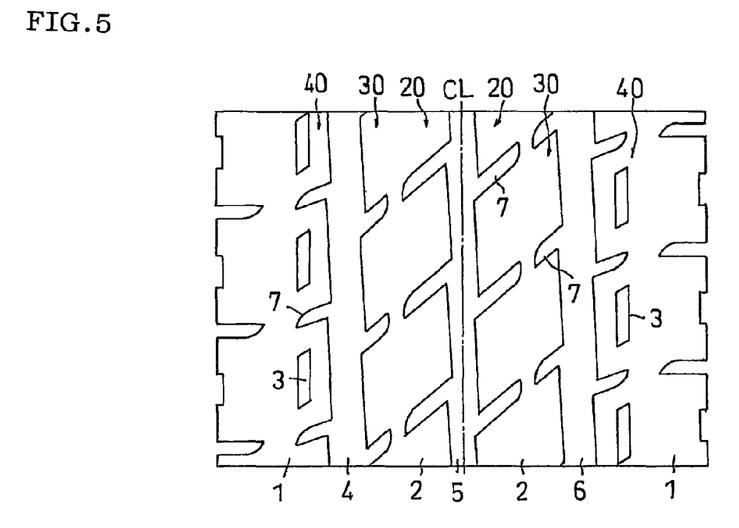
FIG. 5 is an expansion plan view showing an example of a tread surface in accordance with further another embodiment of the present invention.

(1) In the embodiment mentioned above, there is exemplified the example in which the depression row is provided in the edge portions 30 and 40 in both sides in the tire width direction of the main grooves 4 and 6, however, the present invention is not limited to this, but can be appropriately modified in correspondence to a mode of the concerned irregular wear. For example, if the wear speed is particularly slow in the edge portion 30 in an inner side in the tire width direction of the main grooves 4 and 6, the depression row may be provided only in the edge portion 30 as shown in FIG. 4. On the contrary, if the wear speed is particularly slow in the edge portion 40 in an outer side in the tire width direction of the main grooves 4 and 6, the depression row may be provided only in the edge portion 40 as shown in FIG. 5.

Figure 6:
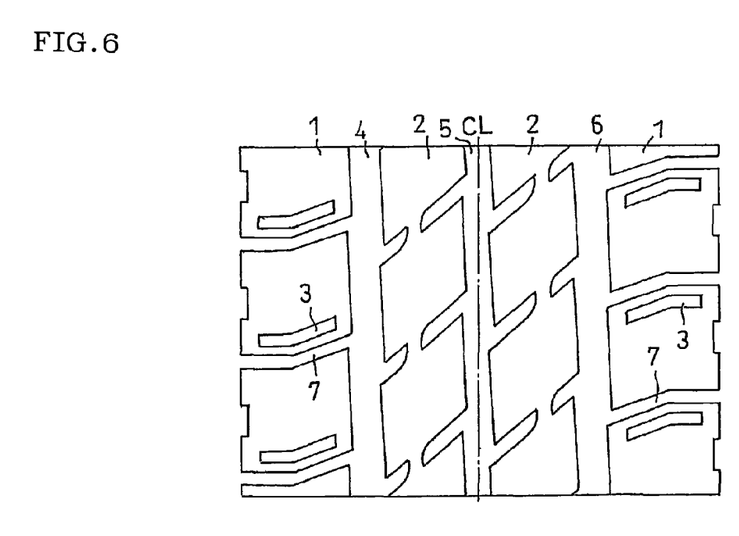
FIG. 6 is an expansion plan view showing an example of a tread surface in accordance with still further another embodiment of the present invention.

(2) In the embodiment mentioned above, there is shown the example in which the first edge portion extends along the tire circumferential direction, however, the present invention is not limited to this. For example, as shown in FIG. 6, in the tread surface in which the shoulder block 1 is completely divided in the tire circumferential direction, the depression row may be structured by setting the depression 3 along the horizontal groove 7 separating the shoulder block 1 and arranging the depression 3 in the tire circumferential direction. In accordance with the structure mentioned above, it is possible to suppress a toe and heel wear. In this case, the effect of suppressing the toe and heel wear can be obtained even in the case of the illustrate example, however, in the case where the depression 3 is set only in the slow wear speed side in a knock-into side and a kick-out side of the shoulder block 1, the suppression effect becomes better.

(3) In the embodiment mentioned above, there is shown the example in which the depression is provided along the main grooves 4 and 6 corresponding to the outermost side in the tier width direction, thereby suppressing the center wear, however, the present invention is not limited thereto. For example, in the tread surface provided with four main grooves including two main grooves sandwiching the tire equator and two main grooves sandwiching them, the ground pressure of the edge portion along the main groove positioned in the outermost side in the tire width direction tends to become higher than the ground pressure of the edge portion along the other main grooves, and a motion (a wiping) to the shoulder side of the main groove positioned in the outermost side in the tire width direction becomes large. Accordingly, the shoulder wear generally tends to be generated. However, in the case mentioned above, the depression is provided along the two main grooves sandwiching the tire equator and the depression is not provided in the other main groove, whereby it is possible to suppress the shoulder wear.

(4) The tread pattern of the pneumatic tire in accordance with the present invention is not limited to the embodiment mentioned above. For example, the land portion of the tread surface may be set to a rib in place of the block row. In the case where the depression row is provided in the edge portion of the rib, it is preferable that a length in the tire circumferential direction of the depression is equal to or more than ⅓ and equal to or less than twice the rib width.

Figure 7:
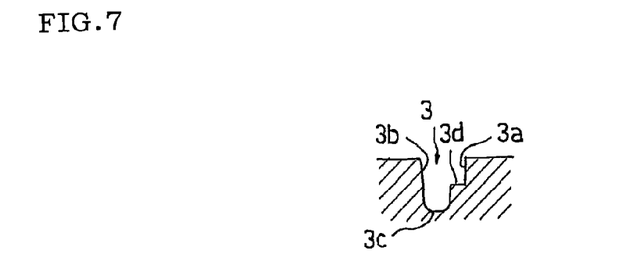
FIG. 7 is a cross sectional view of a depression in accordance with another embodiment of the present invention.

(5) In the embodiment mentioned above, there is shown the example in which the reinforcing portion 8 of the depression 3 is provided as the slope wall, however, may be provided, for example, as a shelf-like wall forming the first inner wall portion 3a in a stepped shape as shown in FIG. 7, in place thereof. In the case mentioned above, since an upper surface 3d of the shelf-like wall appears on the tread surface and the effect of improving the ground pressure of the first edge portion becomes small before a bottom wall portion 3c of the depression 3 appears on the tread surface, it is possible to reduce the effect of improving the ground pressure caused by the depression little by little in correspondence to the wear mode.

Figure 8:
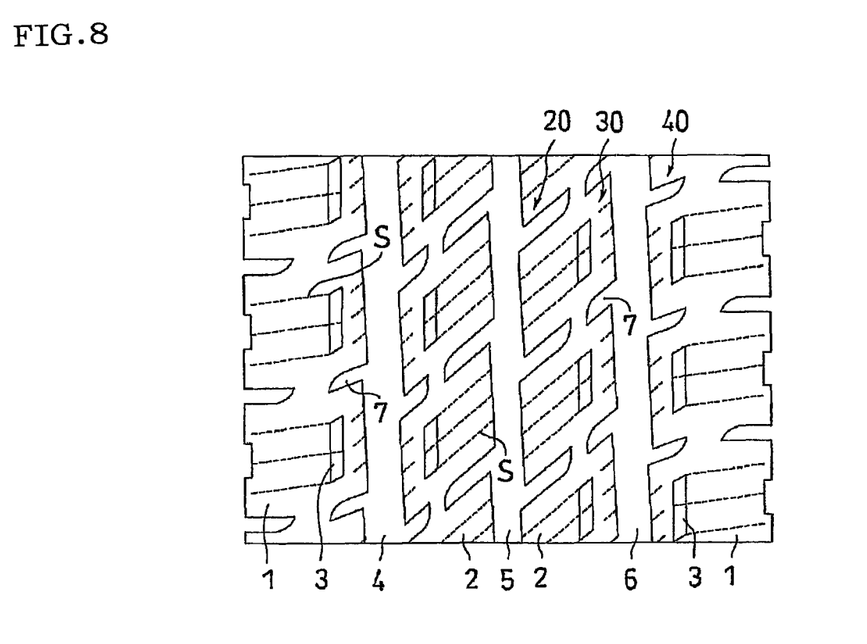
FIG. 8 is an expansion plan view showing an example of a tread surface in accordance with still further another embodiment of the present invention.

(6) The tread pattern of the pneumatic tire in accordance with the present invention may be provided with a sipe. In the case mentioned above, it is preferable that the sipe S shown by a broken line reaches the depression 3 while being open in the block end, as shown in FIG. 8. Accordingly, it is possible to contribute to a reduction of an air pumping sound in the depression 3.

EXAMPLES

An example tire which concretely shows the structure and effect of the present invention will be explained. In this case, an evaluation of each of performances of a tire is executed as follows.

(1) Irregular Wear Resistance (Irregular Wear Ratio)

A test tire (a tire size: LT265/75R16) is installed as a rear tire to a diesel truck (6600 cc, 4WD), an air pressure is set to 520 kPa, and an irregular wear ratio (wear amount in a center side main groove/wear amount in a shoulder side main groove) is calculated after traveling 20000 km on a general road. An irregular wear ratio closer to 1 indicates a wear closer to a uniform wear, that is, an excellent irregular wear resistance.

(2) Drainage Performance

A test tire (a tire size: LT265/75R16) is installed as a rear tire to a diesel truck (6600 cc, 4WD), an air pressure is set to 520 kPa, an air pressure of a front tire is set to 420 kPa, and a speed at a time when a hydroplaning phenomenon is generated during traveling on a straight course having a wet road surface having a water depth of 8 mm is measured. The evaluation is indicated by an index number at a time of setting a comparative example 1 to 100, and a larger numerical value indicates a larger speed and an excellent drainage performance.

Comparative Examples 1 and 2

A comparative example 1 is set to a structure in which a center side main groove is formed in a U-shaped cross section in the tread surface shown in FIG. 2, and a comparative example 2 is set to a structure in which it is formed in a V-shaped cross section, in the same manner. A depth Dg of the main grove is set to 12.5 mm in both examples.

Examples 1 and 2

An example 1 is set to a structure in which the center side main groove is formed in a U-shaped cross section and groove wall angles θ1 and θ2 of the depression are both 0 degree, in the tread surface shown in FIG. 1, and an example 2 is set to a structure in which a reinforcing portion is provided in the depression by setting the groove wall angle θ1 to 10 degree in the same manner. In this case, the depth Dg of the main groove is set to 12.5 mm, a ratio Dd/Dg of the depth of the depression with respect to the main groove is set to 0.40, a ratio Wd/Wb of the width with respect to the block is set to 0.11, a distance G in the tire width direction from the edge end is set to 9 mm, and a ratio Ld/Lb of the length with respect to the block is set to 0.50. Results of the evaluation are shown in Table 1.

TABLE 1

| | Shape of main groove 5 | Depression | Reinforcing portion | Irregular wear ratio | Drainage performance |
|---|---|---|---|---|---|
| Comparative Example 1 | U-shaped cross section | None | None | 2.5 | 100 |
| Comparative Example 2 | V-shaped cross section | None | None | 1.7 | 92 |
| Example 1 | U-shaped cross section | Formed | None | 1.5 | 100 |
| Example 2 | U-shaped cross section | Formed | Formed | 1.8 | 100 |

In accordance with Table 1, it is known that the irregular wear ratio is largest and the center wear is generated in the comparative example 1. Further, in the comparative example 2, it is known that the irregular wear is suppressed by changing the main groove shape, but the drainage performance is deteriorated. On the contrary, in the examples 1 and 2, it is known that it is possible to preferably suppress the irregular wear while securing the drainage performance in spite of forming the main groove in the U-shaped cross section. In this case, in the example 2, since the rigidity of the first edge portion is increased by the reinforcing portion, the center wear makes progress in comparison with the example 1. However, it is possible to regulate so as to prevent the wear speed from becoming too fast, based on the provision of the depression row in the first edge portion, the example 2 is valuable.

What is claimed is:

1. A pneumatic tire in which a tread surface is provided with a groove portion comprising not less than three main grooves continuously extending in a tire circumferential direction, and a land portion including block rows separated from adjacent block rows by the main grooves, wherein the land portion includes:
    a first edge portion having a depression row formed in a block row by arranging long hole shaped depressions extending along at least one of the main grooves in the tire circumferential direction; and
    a second edge portion extending along at least one of the main grooves while being different in position in a tire width direction from the first edge portion, and not having the depression row; and
    wherein the block rows are formed with horizontal grooves that are divided in a midstream, such that adjacent blocks of the block rows in the tire circumferential direction are partly connected with each other,
    wherein a reinforcing portion for increasing rigidity of a first inner wall portion of the depressions is provided in the first inner wall portion located at a near side to an edge end of the first edge portion, rather than at a second inner wall portion of the depressions located at a far side from the edge end, and
    further wherein the tread surface has a sipe in a block, with the sipe extending from a depression in one direction only to open in a single main groove.

2. The pneumatic tire according to claim 1, wherein the main grooves are formed on the tread surface, and the depressions extend along one of the main grooves positioned at an outermost side in the tire width direction and the main groove near a tire equator.

3. The pneumatic tire according to claim 1, wherein a ratio of a depth of the depressions with respect to the main groove is between 0.20 and 0.70.

4. The pneumatic tire according to claim 1, wherein the reinforcing portion is provided as a slope wall of the first inner wall portion in which a groove wall angle with respect to a normal line direction of the tread surface is made larger than that of the second inner wall portion.

5. The pneumatic tire according to claim 1, wherein a ratio of a length of the depressions (Ld) to a length of a block (Lb) in a block row is between 0.15 and 0.80.

* * * * *